United States Patent
Starodoumov et al.

(10) Patent No.: US 7,920,606 B2
(45) Date of Patent: Apr. 5, 2011

(54) FREQUENCY-TRIPLED FIBER MOPA

(75) Inventors: Andrei Starodoumov, Cupertino, CA (US); Norman Hodgson, Belmont, CA (US); Dmitri Simanovski, Palo Alto, CA (US); R. Russel Austin, Cool, CA (US)

(73) Assignee: Coherent, Inc., Santa Clara, CA (US)

( * ) Notice: Subject to any disclaimer, the term of this patent is extended or adjusted under 35 U.S.C. 154(b) by 69 days.

(21) Appl. No.: 12/335,015

(22) Filed: Dec. 15, 2008

(65) Prior Publication Data
US 2010/0150183 A1  Jun. 17, 2010

(51) Int. Cl.
*H01S 3/10* (2006.01)
(52) U.S. Cl. .................. 372/22; 372/6; 372/97
(58) Field of Classification Search ......... 372/22
See application file for complete search history.

(56) References Cited

U.S. PATENT DOCUMENTS

| | | | |
|---|---|---|---|
| 5,136,597 A | 8/1992 | Nightingale | |
| 5,867,305 A * | 2/1999 | Waarts et al. | 359/337.12 |
| 5,940,418 A | 8/1999 | Shields | |
| 7,292,387 B2 | 11/2007 | Hoffman et al. | |
| 2006/0222372 A1 | 10/2006 | Spinelli et al. | 398/183 |
| 2007/0211773 A1 * | 9/2007 | Gerstenberger et al. | 372/22 |
| 2007/0263679 A1 | 11/2007 | Staroudoumov et al. | 372/22 |
| 2007/0263680 A1 | 11/2007 | Starodoumov et al. | 372/22 |

FOREIGN PATENT DOCUMENTS

EP  0605110 A2  7/1994

OTHER PUBLICATIONS

International Search Report and Written Opinion mailed Feb. 5, 2010, for PCT Application No. PCT/US2009/065579 filed Nov. 23, 2009, 11 pages.
Starodoumov, A. N. et al. (Feb. 7, 2008). "Hybrid fiber MOPA-bulk amplifier system for frequency conversion," *Proceedings of the SPIE* 6871:1-8.

* cited by examiner

*Primary Examiner* — Minsun Harvey
*Assistant Examiner* — Xnning Niu
(74) *Attorney, Agent, or Firm* — Morrison & Foerster LLP (57) ABSTRACT

Fundamental-wavelength pulses from a fiber a laser are divided into two portions and the two portions are separately amplified. One of the amplified fundamental-wavelength pulse-portions is frequency-doubled. The frequency doubled portion is sum-frequency mixed with the other amplified fundamental wavelength pulse-portions to provide third-harmonic radiation pulses.

18 Claims, 5 Drawing Sheets

FIG. 5

FREQUENCY-TRIPLED FIBER MOPA

TECHNICAL FIELD OF THE INVENTION

The present invention relates in general to fiber lasers. The invention relates in particular to externally frequency-tripled fiber-MOPA (master oscillator plus power amplifier systems.

DISCUSSION OF BACKGROUND ART

Fiber lasers and amplifiers are increasingly used in applications that require compact and robust monolithic design, good stability and excellent beam quality. Fiber amplifiers exhibit much higher gain, typically between about 20 decibels (dB) and 40 dB, compared to solid-state amplifiers (typically between about 10 dB and 20 dB). This makes fiber master-oscillator plus power amplifier (fiber-MOPA) systems attractive for amplification of a small signal from a master oscillator to high average and peak powers.

A master oscillator (for example, semiconductor diode) can be easily modulated at high pulse repetition rate, for example, up to about 1 Gigahertz (GHz) while generating pulses with an arbitrary length, for example between about 0.1 nanoseconds (ns) and 10 microseconds ($\mu$s). This is one reason why fiber-MOPA systems offer better flexibility and choice in pulse lengths and pulse repetition rates than solid-state lasers.

Most fiber lasers operate at a wavelength in an infrared (IR) wavelength range There is also, however, a growing demand for reliable compact pulsed laser sources in visible and ultraviolet (UV) spectral ranges. This could be satisfied by frequency converting the output of infrared-laser sources.

In general, a narrow linewidth (less than about 0.6 nm), linearly polarization, and high peak power, for example greater than about 1 kilowatt (kW) are required for efficient conversion of IR radiation into visible and UV range. However, conventional high power fiber-laser oscillators usually operate with broader linewidths, for example greater than about 1 nm. Further, high peak power required for efficient harmonic generation is limited by nonlinear effects in fibers such as stimulated Brillouin scattering (SBS), stimulated Raman scattering (SRS), and Four-Wave Mixing (FWM).

There is a need to overcome the above-discussed deficiencies in linewidth and amplification limitation in fiber-MOPA systems suitable for frequency conversion.

SUMMARY OF THE INVENTION

In one aspect of the present invention, the optical apparatus comprises a fiber-MOPA including an arrangement for providing pulses of radiation having a fundamental wavelength. The MOPA also includes an arrangement for dividing the fundamental-wavelength pulses into first and second portions and directing the first and second pulse-portions into respectively first and second output channels. The first and second output channels include respectively first and second fiber-amplifiers for amplifying respectively the first and second fundamental-wavelength pulse-portions. An arrangement is provided for generating second-harmonic radiation pulses from the amplified fundamental-wavelength pulse portions from the first fiber-amplifier. Another arrangement is provided for sum-frequency mixing the second-harmonic radiation pulses with amplified fundamental wavelength pulses from the second fiber-amplifier to provide pulses of third-harmonic radiation.

In preferred embodiments of the inventive apparatus described in detail hereinbelow, the amplified fundamental wavelength pulse portions have either the same of different polarization orientation. Depending on the polarization orientation of the amplified pulse portions, the second-harmonic generation and sum-frequency mixing processes may involve either type-1 or type-2 phase-matching.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Five preferred embodiments of the present invention are described hereinbelow. In each of the embodiments there is a fiber-MOPA having only one seed pulse source but having first and second output channels with one or more fiber amplifier stages in each of the output channels. The output of the first output channel is frequency-doubled in a first frequency-conversion stage. The frequency-doubled radiation is then sum-frequency mixed with the output of the first output channel in a second frequency-conversion stage to provide third-harmonic radiation.

Providing amplification in each channel provides essentially double the total power available for the sum-frequency mixing that would be obtainable with only one output channel having one amplifier similar to the two amplifiers recognizing that there is a limit, as described above, to how much amplification can be provided without significant pulse-spectrum broadening. Using a pulsed laser seed source for the MOPA provides that pulses having a duration between about 0.1 ns and 1 μs can be provided for the frequency doubling and sum-frequency steps. As no residual fundamental radiation from the frequency-doubling step is required for the sum-frequency mixing step, frequency-doubling (second-harmonic generation) efficiency can be maximized. The five embodiments differ from each other in the manner in which the frequency-doubling or sum-frequency mixing are effected. The terms "type1" and "type-2" refer to the phase-matching type, as is known in the art.

Figure 1:
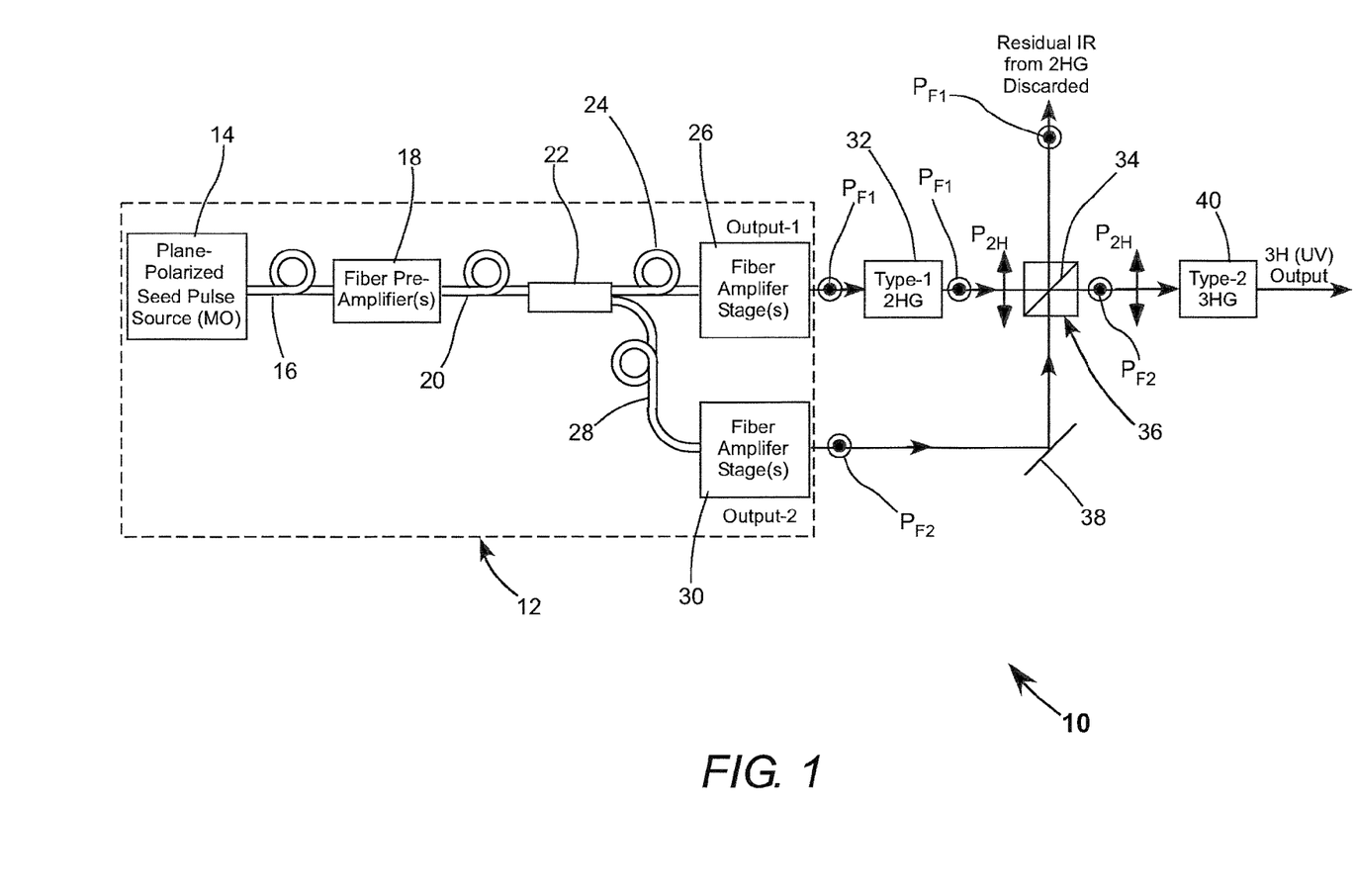
FIG. 1 schematically illustrates a first preferred embodiment of a frequency tripled fiber-MOPA in accordance with the present invention, wherein the fiber-MOPA has a plane-polarized seed pulse source, and wherein the output of the fiber MOPA is divided into first and second portions each of which is subsequently amplified with the amplified first portion being type-1 frequency doubled, and with the frequency-doubled radiation being collinearly type-2 sum-frequency mixed with the amplified second portion of the fiber MOPA output to provide frequency tripled radiation.

Referring now to the drawings, wherein like components are designated by like reference numerals, FIG. 1 schematically illustrates, in block diagram form, one preferred embodiment 10 of a frequency tripled fiber MOPA in accordance with the present invention. In this and all other drawings, fiber-optic connections between fiber optic components are depicted by looped double lines. Beams propagating in free-space are depicted by single lines. Polarization orientations of radiation are depicted either by a single "end-on" arrowhead (indicating horizontal polarization or polarization perpendicular to the plane of the drawing) or a double-headed arrow (indicating vertical polarization pr polarization parallel to the plane of the drawing). Polarization-orientations perpendicular and parallel to the plane of the drawings are referred to arbitrarily herein, for convenience of description, as horizontal and vertical polarization, respectively. Generally, the two orientations are orthogonal.

Continuing with reference to FIG. 1 frequency-tripled MOPA includes a seed pulse source 14, preferably a modulated diode-laser. The seed-pulse source is connected by an optical fiber 16 to one or more fiber pre-amplification stages 18. The output of the preamplifier stage or stages is connected by an optical fiber 20 to a splitter 22. Outputs of the splitter are connected by optical fibers 24 and 28 to fiber amplifiers 26 and 30, respectively, each thereof including one or more stages of amplification. It is assumed and preferred, here, that connecting fibers are polarization-maintaining fibers and the pre-amplifiers include polarization-maintaining gain fibers. In final stages of amplifiers 26 and 30 large mode area (LMA) fibers are preferred.

The output of seed-pulse source 14 is assumed to be horizontally polarized, and the output of each of amplifiers 26 and 30 is also horizontally polarized as indicated by arrowheads $P_{F1}$ and $P_{F2}$, respectively.

The fundamental radiation output (Output-1) of amplifier 26 is directed to a second-harmonic generator (2HG) 32 which includes an optically nonlinear crystal (not shown) arranged for type-1 second-harmonic conversion radiation. Second harmonic radiation from the type-1 2HG is polarized orthogonal to the input fundamental radiation, i.e., is vertically polarized, as indicated in by arrows $P_{2H}$. Preferably, the harmonic conversion in the 2HG is arranged for maximum conversion efficiency, with the crystal preferably being arranged to minimize Poynting vector walk-off between fundamental and 2H-radiations in the crystal of the 2HG. Poynting vector walk-off compensation for collinearly propagating beams is described in detail in U.S. Pat. No. 5,136,597 granted to John Nightingale, assigned to the assignee of the present invention, and the complete disclosure of which is hereby incorporated by reference. Conversion efficiency can be as high as about 80% depending on the fundamental wavelength and the material and configuration of the crystal selected.

As the conversion efficiency can never be 100%, residual fundamental radiation pass out of the second harmonic generator 32. The beam quality of this radiation will be poor, as the beam intensity on axis will have been depleted to an extent greater than the intensity is depleted off-axis by the second-harmonic conversion process. The quality will usually be sufficiently poor that this residual radiation is unsuitable for further frequency conversion. This residual fundamental radiation, being horizontally polarized, is directed out of fiber-MOPA 10 by reflection from a polarization selective reflecting surface 34 of a bi-prism 36. The 2H-radiation, being vertically polarized, is transmitted by surface 34.

The fundamental radiation output of amplifier 30 (Output-2) is directed via a mirror 38 to bi-prism 36 and is reflected from surface 34 thereof collinear with the 2H-radiation transmitted by surface 34. The collinear propagating fundamental and 2H-beams are directed to a third-harmonic generator (3HG) 40 which includes an optically nonlinear crystal (also not shown) arranged for type-2 sum-frequency mixing to generate third-harmonic (3H) radiation. For fundamental radiation having a wavelength between about 900 nm and 1100 nm, the third-harmonic radiation would have a wavelength in the UV region of the electromagnetic spectrum.

It should be noted that the division ratio of splitter 22 can be selected based on the gain of amplifiers 26 and 30 and the efficiency of the harmonic generators to minimize residual fundamental and 2H-radiation from the sum-frequency mixing stage. While there will always be some such residual radiation, this radiation can be separated from the 3H output by any well know means.

It should also be noted, in this and other embodiments described hereinbelow, that each the harmonic generators 32 and 40 would typically include relay optics to focus radiation into the optically nonlinear crystal therein and temperature and environmental controls for the crystal. A detailed description of such optics or controls is not required for understanding the principles of the present invention. Accordingly no such detailed description is presented herein.

It should further be noticed that throughout the various apparatuses describe the radiation is in the form of pulses, and for most effective third-harmonic generation, fundamental radiation pulses and second-harmonic radiation pulses should temporally overlap in the third-harmonic generator. This can be arranged by choosing appropriate optical paths for the second-harmonic radiation and fundamental-wavelength radiation pulses.

Figure 2:
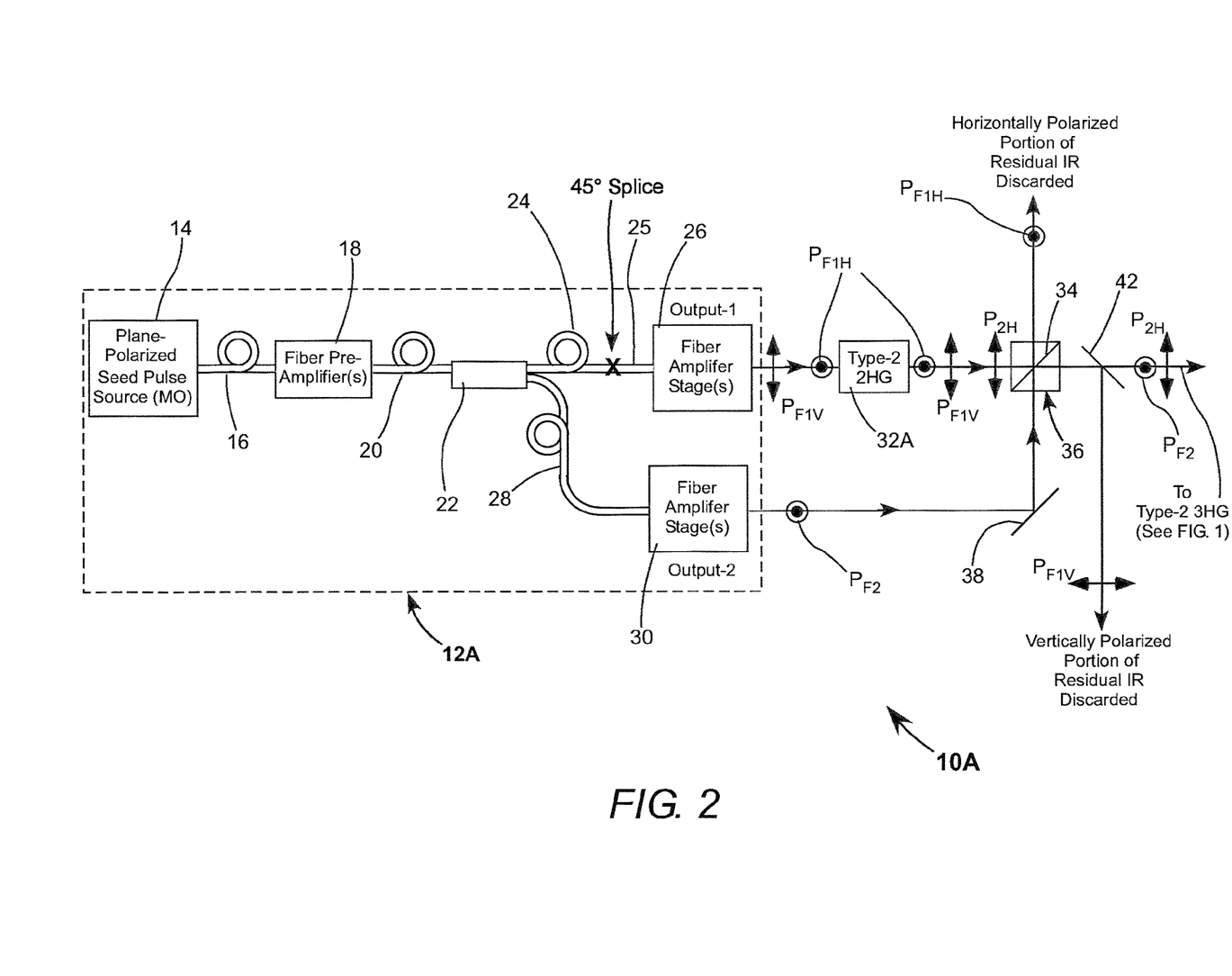
FIG. 2 schematically illustrates a second preferred embodiment of a frequency tripled fiber-MOPA in accordance with the present invention similar to the fiber-MOPA of FIG. 1 but wherein the amplified first portion of the fiber-MOPA output is type-2 frequency-doubled.

FIG. 2 schematically illustrates a second embodiment 10A of a frequency tripled fiber-MOPA in accordance with the present invention. Frequency-tripled fiber-MOPA 10A is similar to frequency-tripled fiber-MOPA 10 of FIG. 1 with exceptions as follows. In frequency-tripled fiber-MOPA 10A, fiber-MOPA 12A delivers from output-1 thereof fundamental radiation which includes both horizontally and vertically polarized components. This is effected by connecting the appropriate output of splitter 22 to amplifier 26 via polarization-maintaining optical fiber 24 and another polarization maintaining fiber 25 with axes thereof at an angle, for example 45°, to corresponding axes of polarization-maintaining fiber 24. This resolves the horizontally polarized radiation carried by fiber 24 into vertically and horizontally polarized components which are equally amplified by amplifier 26. These amplified components, designated respectively $P_{F1V}$ and $P_{F11I}$ in FIG. 2, are directed to a 2HG 32A which includes an optically nonlinear crystal (not shown) arranged for type-2 second-harmonic generation, with the 2H-radiation generated being vertically polarized as indicated by arrows P2H. Here again there will be residual fundamental radiation but in two polarization orientations. Horizontally polarized residual fundamental radiation will be directed out of the MOPA (discarded) by surface 34 of prism 36. If it is desired to discard the vertically polarized component, which will be transmitted by surface 34, before third-harmonic generation is effected, this can be done using a dichroic reflector 42. Type-2 third-harmonic generation takes place as described above with reference to frequency-tripled MOPA 10 of FIG. 1. One advantage of splitting radiation to be amplified between two polarization components is that above-described nonlinear effects can be reduced by up to about 17%. This helps to maintain a narrow spectral bandwidth signal which is optimum for frequency conversion.

One other option for creating two polarization components in output-1 is to rotate fiber-axes at about 45 degrees in a fiber coupled isolator (not shown), which typically separates amplification stages in a multi-stage fiber amplifier. Those skilled in the art may devise other methods without departing from the spirit and scope of the present invention.

Figure 3:
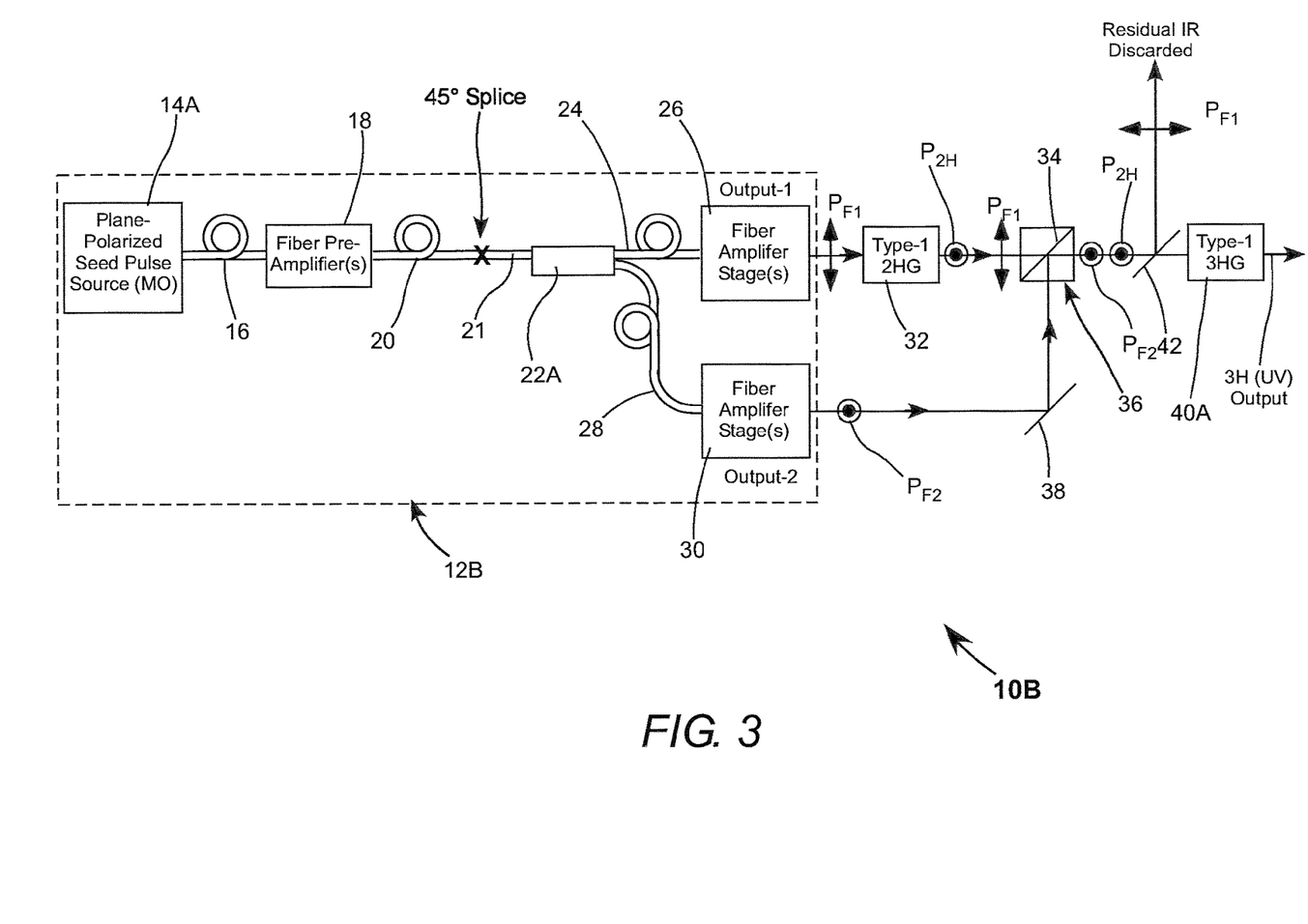
FIG. 3 schematically illustrates a third preferred embodiment of a frequency tripled fiber-MOPA in accordance with the present invention similar to the fiber-MOPA of FIG. 1 but wherein the fiber-MOPA output is un-polarized or elliptically polarized before being divided, and wherein the amplified first portion of the fiber-MOPA output is type-1 frequency-doubled and the sum-frequency mixing is type-1 sum-frequency mixing.

FIG. 3 schematically illustrates a third embodiment 10B of a frequency tripled fiber-MOPA in accordance with the present invention. Frequency-tripled fiber-MOPA 10A is similar to frequency-tripled fiber-MOPA 10 of FIG. 1 with exceptions as follows. In frequency-tripled fiber-MOPA 10B, fiber-MOPA 12B delivers from output-1 thereof fundamental radiation which is vertically polarized (see arrows $P_{F1}$), and delivers from output-2 thereof fundamental radiation which is horizontally polarized (see arrows $P_{F2}$). This is effected, here, by providing a 45°-splice between fibers 20 and 21 connecting pre-amplifier stage 18 to a fiber polarizing-splitter 22A. The splice provides two polarization components, as described above with reference to frequency-tripled MOPA 10A of FIG. 2, with the components being separated by splitter 22A. Those skilled in the art may derive other methods of providing orthogonally polarized outputs without departing from the spirit and scope of the present invention.

Second-harmonic generator 32 generates 2H-radiation by type-1 frequency-conversion (type-1 frequency-multiplication) with 2H radiation horizontally polarized as indicated by arrowhead $P_{2H}$. Surface 34 of bi-prism 36 must be configured here to transmit horizontally polarized 2H-radiation while being polarization-selective for fundamental radiation for reflecting radiation from output 2 of MOPA 12B. Accordingly, if it is necessary to discard fundamental radiation residual from 2HG 32, a separate dichroic element 42 must be provided. A third-harmonic generator 40A, including an optically nonlinear crystal (not shown) arranged for type-1 sum-frequency mixing, generates 3H-radiation from the identically plane-polarized fundamental and 2H-radiations.

Figure 4:
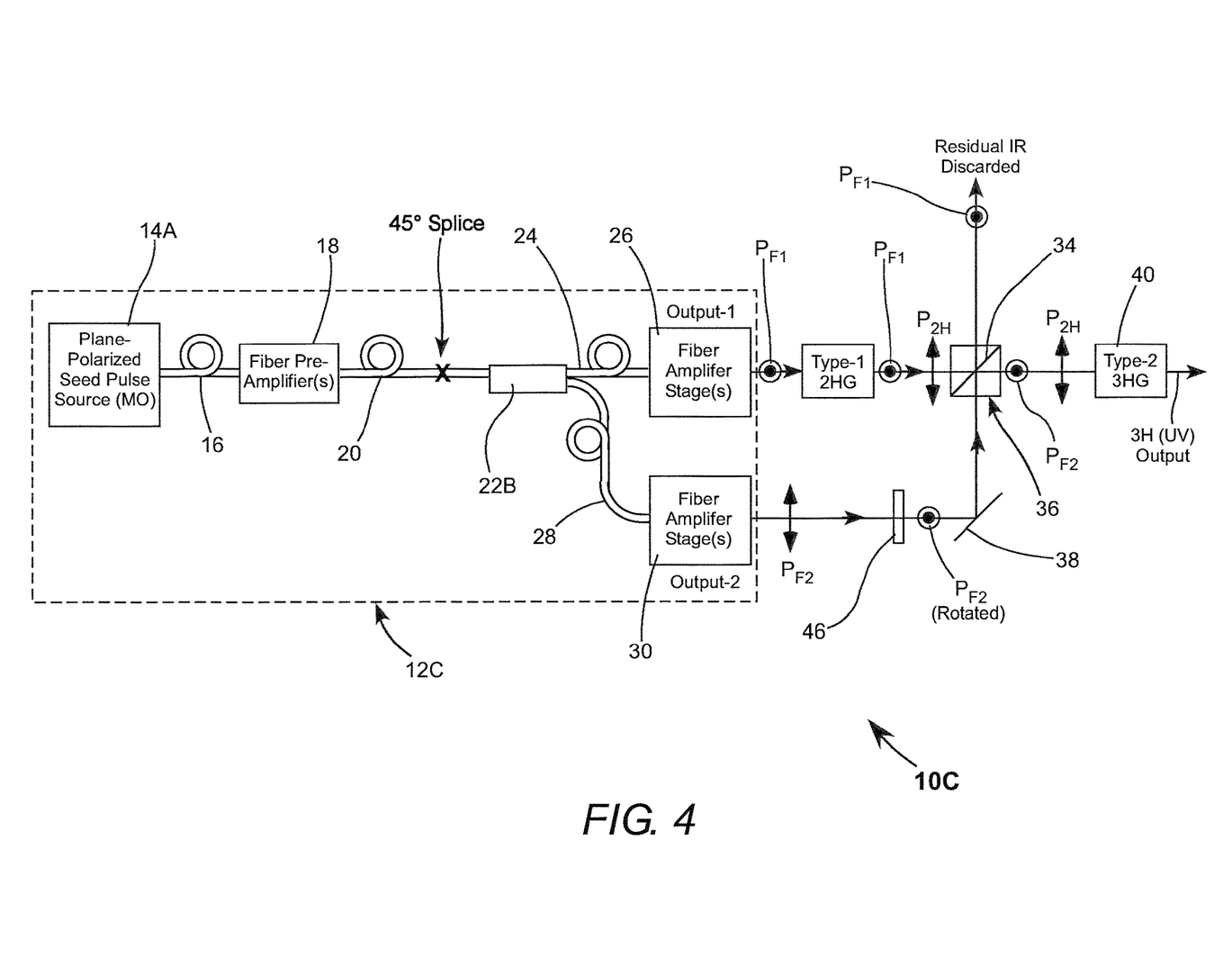
FIG. 4 schematically illustrates a fourth preferred embodiment a frequency tripled fiber-MOPA in accordance with the present invention similar to the fiber-MOPA of FIG. 3 but wherein the sum-frequency mixing is type-2 sum-frequency mixing.

FIG. 4 schematically illustrates a third embodiment 10C of a frequency tripled fiber-MOPA 10C in accordance with the present invention. Frequency-tripled fiber-MOPA 10C is similar to frequency-tripled fiber-MOPA 10B of FIG. 3 with the exception that a MOPA 12C of frequency-tripled fiber-MOPA 10C includes a fiber polarization splitter 22B configured such that fiber-MOPA 12C delivers from output-1 thereof fundamental radiation which is horizontally polarized (see arrows $P_{F1}$), and delivers from output-2 thereof fundamental radiation which is vertically polarized (see arrows $P_{F2}$). In this embodiment, 2H-radiation generated by 2HG 32 is vertically polarized (see arrows P2H) and is easily transmitted by surface 34 of bi-prism 36. Residual fundamental radiation is horizontally polarized is discarded by surface 34. The vertically polarized radiation from output-2 of MOPA 12C is rotated into a horizontally polarized orientation by a half-wave plate 46 and is reflected by surface 34 of bi-prism 36 collinear with the transmitted 2H-radiation. The transmitted 2H-radiation and reflected fundamental radiation are sum-frequency mixed by type-2 sum frequency mixing in 3HG 40.

Thos skilled in the art will recognize that the arrangements similar to the arrangements of FIGS. 3 and 4 are possible, in which the plane-polarized seed-pulse source is replaced by an un-polarized or elliptically polarized seed-pulse source. In such an arrangement, of course, the 45-splice would be omitted. One such un-polarized seed pulse source could be a fiber laser pumped by a pulsed diode-laser source.

In all four embodiments of the present invention described above, 3H-generation is effected by delivering fundamental and 2H-radiation beams collinearly to crystal. The Poynting vector walk-off compensation disclosure of the above mentioned Nightingale patent is applicable to such 3H-generation in addition to 2H-generation. In a later U.S. Pat. No. 7,292,387, granted to Hoffman et al., the complete disclosure of which is hereby incorporated by reference, it is taught that walk-off compensation may be further enhanced by having orthogonally-polarized fundamental and 2H-radiation beams enter a suitably-cut crystal at an angle to each other. What is taught in the Nightingale patent is in fact a special case (where the angle is zero) of what is taught in the Hoffman et al. patent. In the Hoffman et al. patent, it is taught that collinearly propagating orthogonally plane-polarized residual-fundamental and generated-2H beams from a 2H-generation process can be caused to diverge from each other, and then converge on a 3H-generator at a selected angle for walk-off compensation, by locating a prism of a birefringent material between the 2H-generator and the 3H-generator.

In the frequency tripled MOPA of the present invention, the 3H-radiation is not generated from residual-fundamental radiation but from fundamental radiation direct from one output of a two-output fiber MOPA. Accordingly, the beam of 2H radiation and the fundamental radiation beam to be mixed are already separated, and can be directly converged into a 3H-generator arranged as described in the Hoffman et al patent. This permits at least a fifth embodiment of a frequency-tripled MOPA in accordance with the present invention, a description of which is set forth below with reference to FIG. 5.

Figure 5:
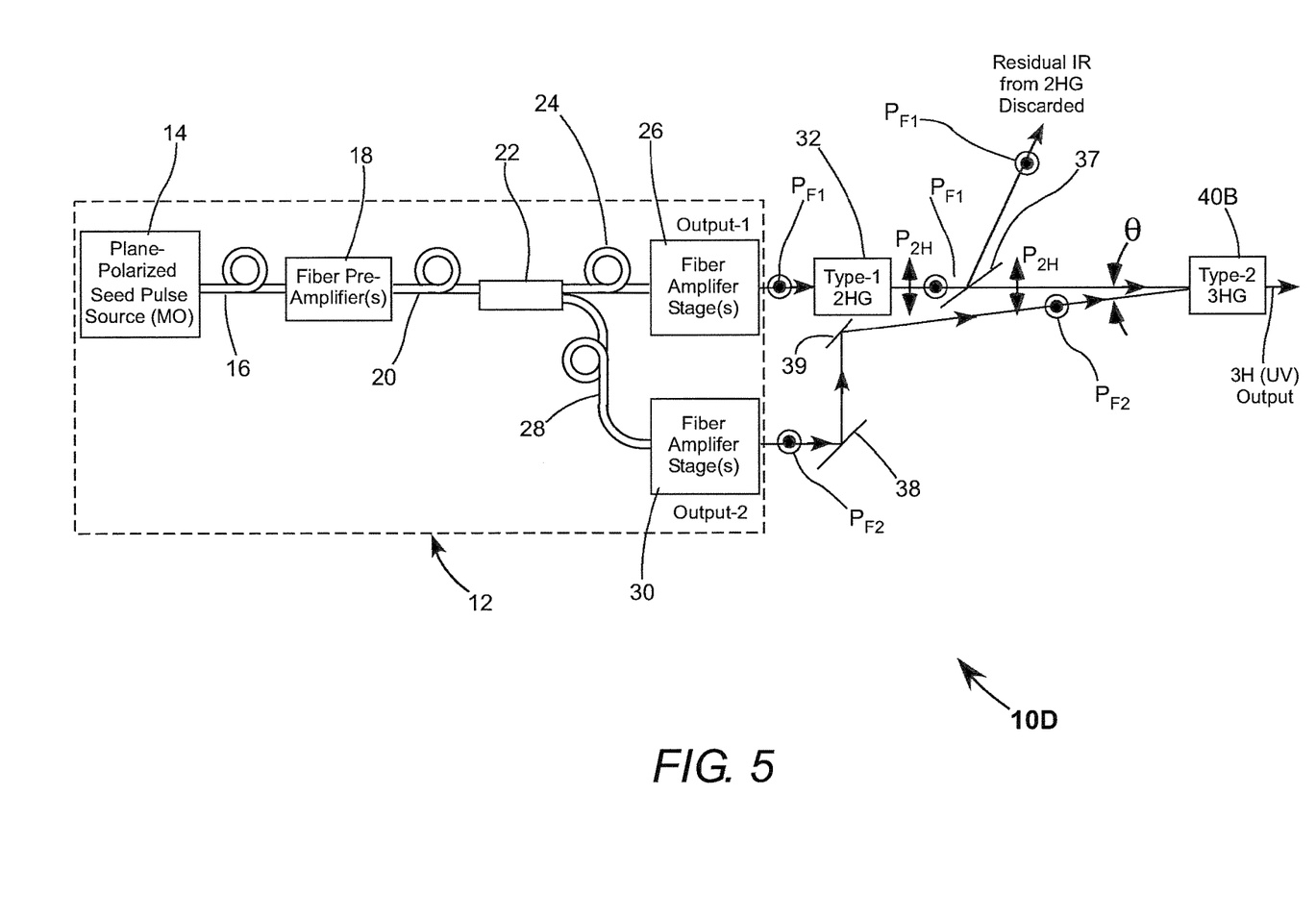
FIG. 5 schematically illustrates a fourth preferred embodiment a frequency tripled fiber-MOPA in accordance with the present invention similar to the fiber-MOPA of FIG. 1 but wherein the type-2 sum-frequency mixing is non-collinear.

FIG. 5 depicts a frequency-tripled fiber MOPA 10D, which is similar to frequency-tripled fiber MOPA 10 of FIG. 1 except for the manner in which sum-frequency mixing is effected. Here, the polarizing bi-prism 36 of frequency-tripled fiber MOPA 10 is omitted and replaced by a dichroic filter 37 arranged to reflect the fundamental wavelength and transmit the second-harmonic radiation to a third-harmonic generator 40B which includes a nonlinear crystal arranged to accept converging fundamental and 2H beams as taught in the Hoffman et al. patent. Mirrors 38 and 39 direct the output of amplifier 30 of MOPA 12 into 3HG 40B at the angle θ selected for walk-off optimization. By way of example, for sum-frequency mixing 1064-nm radiation and 532-nm radiation in a crystal of lithium borate (LBO), one suitable value for θ is about 1°.

The arrangement of FIG. 5, in addition to providing a possible improvement in 3HG efficiency, eliminates the need for the beam combining arrangements of the frequency tripled MOPAs of FIGS. 1-4. This arrangement is not limited for use with the MOPA configuration of FIG. 1. Those skilled in the art may use this type-2 3HG arrangement with other separately-amplified two-output fiber MOPAs without departing from the spirit and scope of the present invention.

In summary, the present invention is described above in terms of a preferred and other embodiments. The invention is not limited, however, to the embodiments described and depicted herein. Rather, the invention is limited only by the claims appended hereto.

What is claimed is:

1. Optical apparatus, comprising:
a fiber-MOPA, the fiber MOPA including an arrangement for providing pulses of radiation having a fundamental wavelength, an arrangement for dividing the fundamental-wavelength pulses into first and second portions and directing the first and second pulse-portions into respectively first and second output channels, and first and second fiber-amplifiers in respectively the first and second channels for amplifying respectively the first and second fundamental-wavelength pulse-portions;
an arrangement for generating second-harmonic radiation pulses from the amplified fundamental-wavelength pulse portions from the first fiber-amplifier; and
an arrangement for sum-frequency mixing the second-harmonic radiation pulses with amplified second fundamental-wavelength pulse-portions from the second fiber-amplifier to provide pulses of third-harmonic radiation and wherein there are residual portions of the amplified fundamental-wavelength pulse-portions from the first fiber-amplifier remaining from the second-harmonic generation process, and wherein the apparatus includes means for preventing the residual portions from entering the sum-frequency mixing arrangement.

2. The apparatus of claim 1, wherein the amplified first and second fundamental-wavelength pulse-portions are plane-polarized in the same orientation, the second harmonic generation is type-1 second-harmonic generation, and the sum frequency mixing is type-2 sum-frequency mixing.

3. The apparatus of claim 1, wherein the amplified first fundamental-wavelength pulse-portions have horizontal and vertical polarization components, the amplified second fundamental-wavelength pulse-portions are horizontally plane-polarized, the second-harmonic generation is type-2 second-harmonic generation, and the sum frequency mixing is type-2sum-frequency mixing.

4. The apparatus of claim 1, wherein the amplified first fundamental-wavelength pulse-portions are vertically plane-polarized, the amplified second fundamental-wavelength pulse-portions are horizontally plane polarized, the second-harmonic generation is type-1 second-harmonic generation, and the sum frequency mixing is type-1 sum-frequency mixing.

5. The apparatus of claim 1, wherein there is polarization rotating device between the second fiber-amplifier and the third harmonic generation, wherein the amplified first fundamental-wavelength pulse-portions are horizontally plane-polarized, the amplified second fundamental-wavelength pulse-portions are vertically plane-polarized on exiting the second fiber-amplifier, the polarization rotating device is configure to rotate the vertical orientation of the amplified second fundamental-wavelength pulse-portions to a horizontal orientation, the second-harmonic generation is type-1 second-harmonic generation, and the sum-frequency mixing is type-2 sum-frequency mixing.

6. The apparatus of claim 1, wherein there is an arrangement for combining the second-harmonic radiation pulses and the amplified second fundamental-wavelength pulse-portions on a common path to the sum-frequency mixing arrangement 7. The apparatus of claim 1, wherein the second-harmonic radiation pulses and the amplified second fundamental wavelength pulse-portions from the second fiber-amplifier are directed into the sum-frequency mixing arrangement on respectively first and second paths at an angle to each other.

8. The apparatus of claim 7, wherein the angle between the first and second paths is selected cooperative with the sum-frequency generating arrangement to minimize Poynting-vector walk-off in the sum-frequency generating process.

9. Optical apparatus, comprising:
a fiber-MOPA, the fiber MOPA including an arrangement for providing pulses of radiation having a fundamental wavelength, an arrangement for dividing the fundamental-wavelength pulses into first and second portions and directing the first and second fundamental-wavelength pulse-portions into respectively first and second output channels, and first and second fiber-amplifiers in respectively the first and second channels for amplifying respectively the first and second fundamental-wavelength pulse-portions;
an arrangement for generating second-harmonic radiation pulses from the amplified fundamental-wavelength pulse portions from the first fiber-amplifier;
a polarization-selective reflective and transmissive surface arranged to cause the second-harmonic radiation pulses and amplified second fundamental-wavelength pulse-portions from the second fiber-amplifier to propagate collinearly along a common path; and
a sum-frequency generator arranged to receive the collinearly propagating second-harmonic radiation pulses and amplified second fundamental-wavelength pulse-portions and sum-frequency mix the second-harmonic radiation pulses and amplified second fundamental-wavelength pulse-portions to provide pulses of third-harmonic radiation and wherein there are residual portions of the amplified fundamental-wavelength pulse portions from the first fiber-amplifier remaining from the second-harmonic generation process, and wherein the polarization-selective reflective and transmissive surface prevents these residual portions of the amplified fundamental-wavelength pulses from entering the sum-frequency generator.

10. The apparatus of claim 9, wherein the polarization-selective reflective and transmissive surface is an internal surface of a bi-prism.

11. The apparatus of claim 9, wherein the amplified first and second fundamental-wavelength pulse-portions are each horizontally polarized, the second-harmonic radiation pulses are vertically polarized, the polarization-selective reflective and transmissive surface is reflective for horizontally polarized fundamental radiation and transmissive for vertically polarized second-harmonic radiation, and wherein the polarization-selective reflective and transmissive surface transmits the second-harmonic radiation pulses along the common path and reflects the amplified second fundamental-wavelength pulse-portions along the common path.

12. The apparatus of claim 9, wherein the amplified first fundamental-wavelength pulse portions have horizontal and vertical polarization components, the amplified second fundamental-wavelength pulse-portions are horizontally plane-polarized, the second-harmonic pulses are vertically polarized, the polarization-selective reflective and transmissive surface is reflective for horizontally polarized fundamental radiation and transmissive for second-harmonic radiation, and wherein the polarization-selective reflective and transmissive surface transmits the second-harmonic radiation pulses along the common path and reflects the amplified second fundamental-wavelength pulse-portions along the common path.

13. The apparatus of claim 9, wherein the amplified first fundamental-wavelength pulse-portions are vertically plane-polarized, the amplified second pulse portions are horizontally plane polarized, the second-harmonic pulses are horizontally polarized the polarization-selective reflective and transmissive surface is reflective for horizontally polarized fundamental radiation and transmissive for horizontally polarized fundamental radiation and second-harmonic radiation, and wherein the polarization-selective reflective and transmissive surface transmits the second-harmonic radiation pulses along the common path and reflects the amplified second fundamental-wavelength pulse-portions along the common path.

14. A method of generating third harmonic pulses comprising the steps of:
   generating fundamental laser pulses from a fiber master oscillator;
   splitting each of the pulses between first and second propagation channels;
   amplifying the fundamental pulses in the first channel;
   frequency converting the amplified fundamental pulses in the first channel into second harmonic pulses;
   amplifying the fundamental pulses in the second channel; and
   sum frequency mixing the second harmonic pulses and the amplified fundamental of the second channel to generate third harmonic pulses and wherein there are residual portions of the amplified fundamental-wavelength pulses remaining from the frequency converting step and further including the step of excluding the residual portions from the sum-frequency mixing step.

15. A method as recited in claim 14, wherein the frequency conversion step is type-1 and the sum frequency mixing step is type-2.

16. A method as recited in claim 14, wherein the frequency conversion step is type-2 and the sum frequency mixing step is type-2.

17. A method as recited in claim 14, wherein the frequency conversion step is type-1 and the sum frequency mixing step is type-1.

18. Optical apparatus, comprising:
   a fiber-MOPA, the fiber MOPA including an arrangement for providing pulses of radiation having a fundamental wavelength, an arrangement for dividing the fundamental-wavelength pulses into first and second portions and directing the first and second fundamental-wavelength pulse-portions into respectively first and second output channels, and first and second fiber-amplifiers in respectively the first and second channels for amplifying respectively the first and second fundamental-wavelength pulse-portions;
   an arrangement for generating second-harmonic radiation pulses from the amplified fundamental-wavelength pulse portions from the first fiber-amplifier;
   a polarization-selective reflective and transmissive surface arranged to cause the second-harmonic radiation pulses and amplified second fundamental-wavelength pulse-portions from the second fiber-amplifier to propagate collinearly along a common path; and
   a sum-frequency generator arranged to receive the collinearly propagating second-harmonic radiation pulses and amplified second fundamental-wavelength pulse-portions and sum-frequency mix the second-harmonic radiation pulses and amplified second fundamental-wavelength pulse-portions to provide pulses of third-harmonic radiation and wherein the amplified first and second fundamental-wavelength pulse-portions are each horizontally polarized, the second-harmonic radiation pulses are vertically polarized, the polarization-selective reflective and transmissive surface is reflective for horizontally polarized fundamental radiation and transmissive for vertically polarized second-harmonic radiation, and wherein the polarization-selective reflective and transmissive surface transmits the second-harmonic radiation pulses along the common path and reflects the amplified second fundamental-wavelength pulse-portions along the common path.

* * * * *